United States Patent [19]
Avila

[11] Patent Number: 5,141,241
[45] Date of Patent: Aug. 25, 1992

[54] RECREATION CART APPARATUS

[76] Inventor: Freddie Avila, 7951 Garvey Ave., Rosemead, Calif. 91770

[21] Appl. No.: 772,553

[22] Filed: Oct. 7, 1991

[51] Int. Cl.⁵ ............................................. B62B 3/10
[52] U.S. Cl. ........................... 280/47.371; 280/47.38; 280/79.2; 188/19; 188/21; 188/74
[58] Field of Search ............... 280/47.17, 47.24, 47.25, 280/47.26, 47.34, 47.35, 47.38, 47.371, 79.2, 79.11, 87.021, 79.3, 651, 657; 188/19, 72.1, 73.1, 73.31, 74, 75, 78, 9, 10, 11, 20, 21, 52, 53, 54

[56] References Cited

U.S. PATENT DOCUMENTS

| | | | |
|---|---|---|---|
| 496,245 | 4/1893 | Barrow | 188/53 |
| 559,951 | 7/1897 | Latty | 188/21 |
| 656,608 | 8/1900 | Moore | 188/53 |
| 809,912 | 1/1906 | Ferris | 188/21 |
| 2,961,250 | 11/1960 | Beach | 280/79.11 |
| 4,887,836 | 12/1989 | Simijian | 280/47.371 |

Primary Examiner—Andres Kashnikow
Assistant Examiner—Richard Camby
Attorney, Agent, or Firm—Leon Gilden

[57] ABSTRACT

A recreation cart is provided, wherein the cart structure permits the selective securement of a foldable seat structure mounted to the cart, wherein the seat structure includes a plurality of sockets to receive the seat structure in a fixed orientation relative to the cart organization in use.

2 Claims, 4 Drawing Sheets

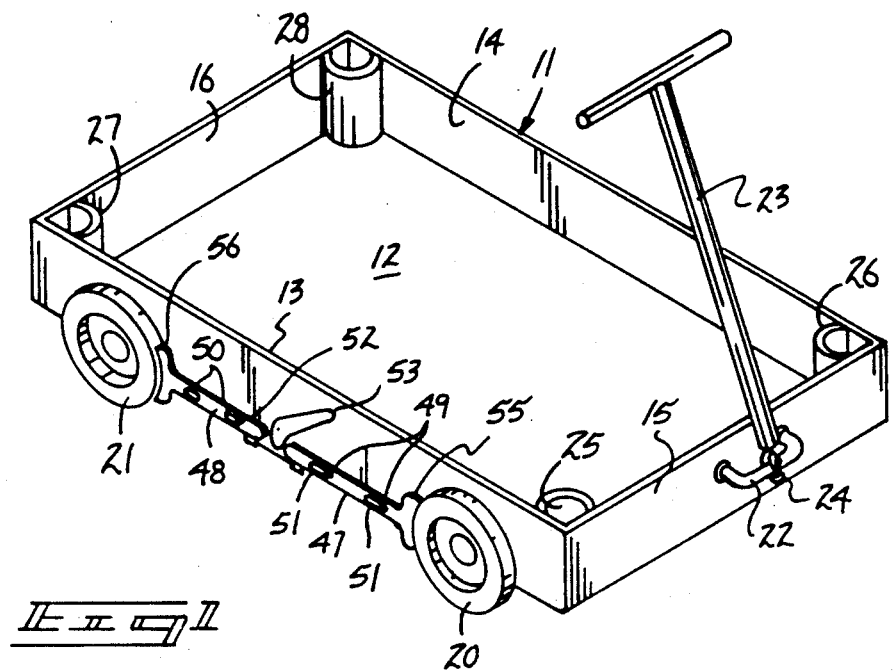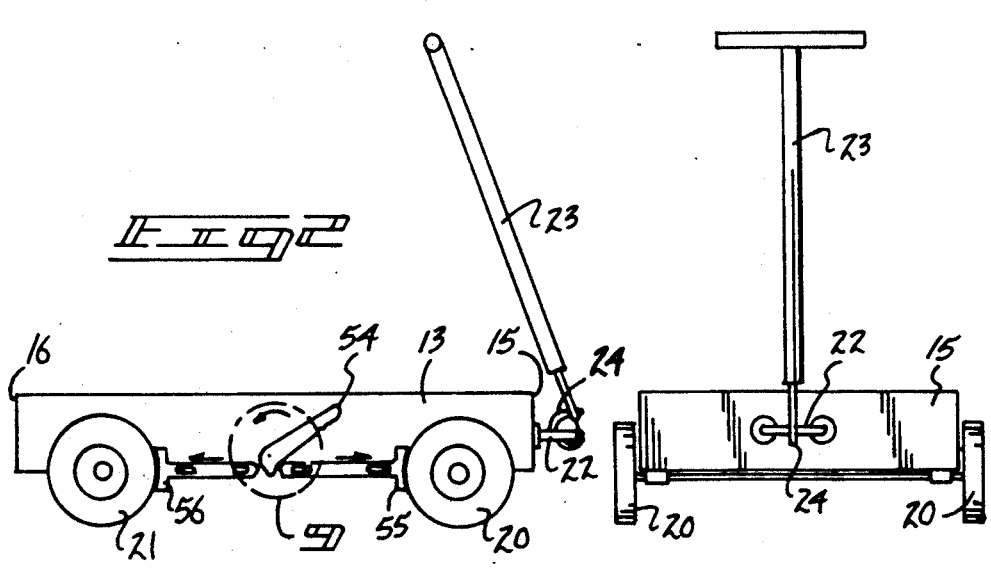

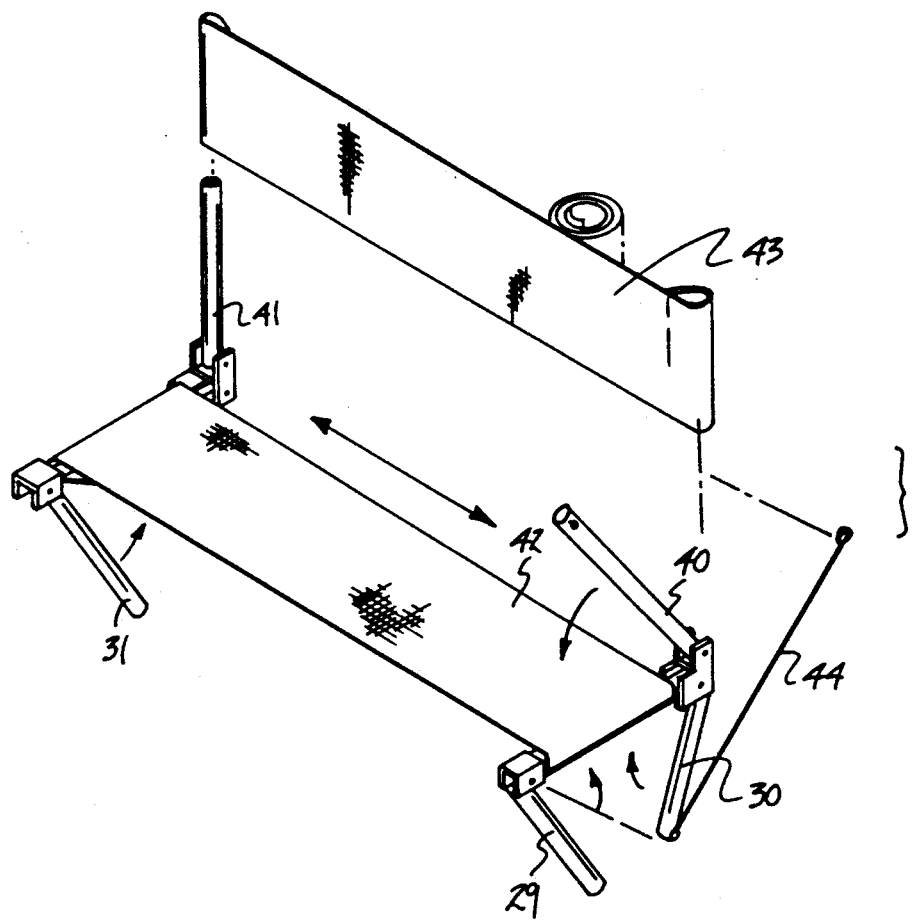
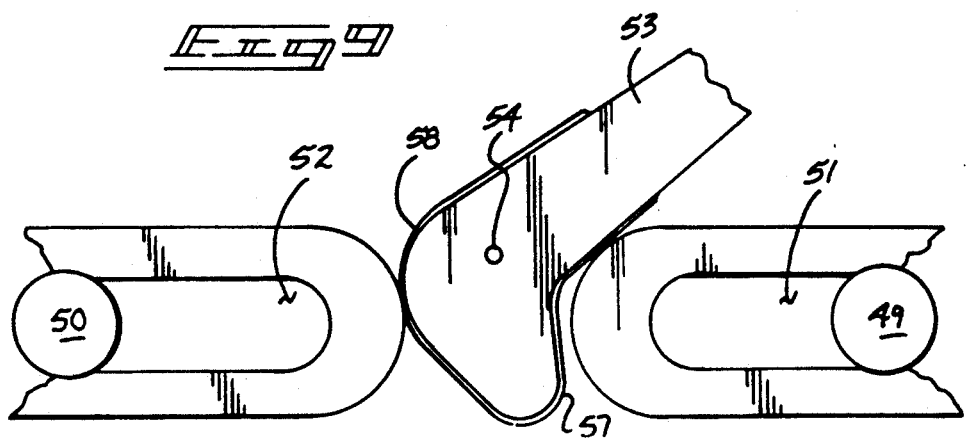

RECREATION CART APPARATUS

BACKGROUND OF THE INVENTION

1. Field of the Invention

The field of invention relates to wagon and cart apparatus, and more particularly pertains to a new and improved recreation cart apparatus wherein the same is arranged for accommodation of individuals in a seated orientation relative to a cart structure for the entertainment and amusement of such individuals in use of the cart structure.

2. Description of the Prior Art

Carts of various types are utilized throughout the prior art to accommodate specialized applications and for particular purposes and needs. Such apparatus is exemplified in U.S. Pat. No. 4,856,346 to Carlile wherein a cart structure is of a collapsible construction permitting its inter-related storage relative to itself to permit folding for ease of transport and storage.

U.S. Pat. No. 4,796,909 to Kirkendall sets forth a cart arrangement utilizing a mesh bed structure for permitting transport of heavy loads, as well as of a lightweight construction.

U.S. Pat. No. 3,693,993 to Mazzarelli, et al. wherein a beach tote cart includes a basket arrangement to transport components therewithin.

U.S. Pat. No. 4,316,615 to Willette sets forth a picnic and beach cart arrangement providing for inter-folded members mounted thereon for containing articles within the apparatus.

As such, it may be appreciated that there continues to be a need for a new and improved recreation cart apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of cart apparatus now present in the prior art, the present invention provides a recreation cart apparatus wherein the same is arranged for conversion from cart to seat structure in association with the cart for amusement and entertainment of individuals in use. As such, the general purpose of the present invention, which will be described subsequently in greater detail, is to provide a new and improved recreation cart apparatus which has all the advantages of the prior art cart apparatus and none of the disadvantages.

To attain this, the present invention provides a recreation cart wherein the cart structure permits the selective securement of a foldable seat structure mounted to the cart, wherein the seat structure includes a plurality of sockets to receive the seat structure in a fixed orientation relative to the cart organization in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved recreation cart apparatus which has all the advantages of the prior art cart apparatus and none of the disadvantages.

It is another object of the present invention to provide a new and improved recreation cart apparatus which may be easily and efficiently manufactured and marketed.

It is a further object of the present invention to provide a new and improved recreation cart apparatus which is of a durable and reliable construction.

An even further object of the present invention is to provide a new and improved recreation cart apparatus which is susceptible of a low cost of manufacture with regard to both materials and labor, and which accordingly is then susceptible of low prices of sale to the consuming public, thereby making such recreation cart apparatus economically available to the buying public.

Still yet another object of the present invention is to provide a new and improved recreation cart apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic side view of the instant invention.

FIG. 3 is an orthographic front view, taken in elevation, of the invention.

FIG. 8 is an isometric illustration illustrating the seat structure in a partially folded configuration.

FIG. 9 is an enlarged orthographic view of section 9 as set forth in FIG. 2.

DESCRIPTION OF THE PREFERRED EMBODIMENT

Figure 4:
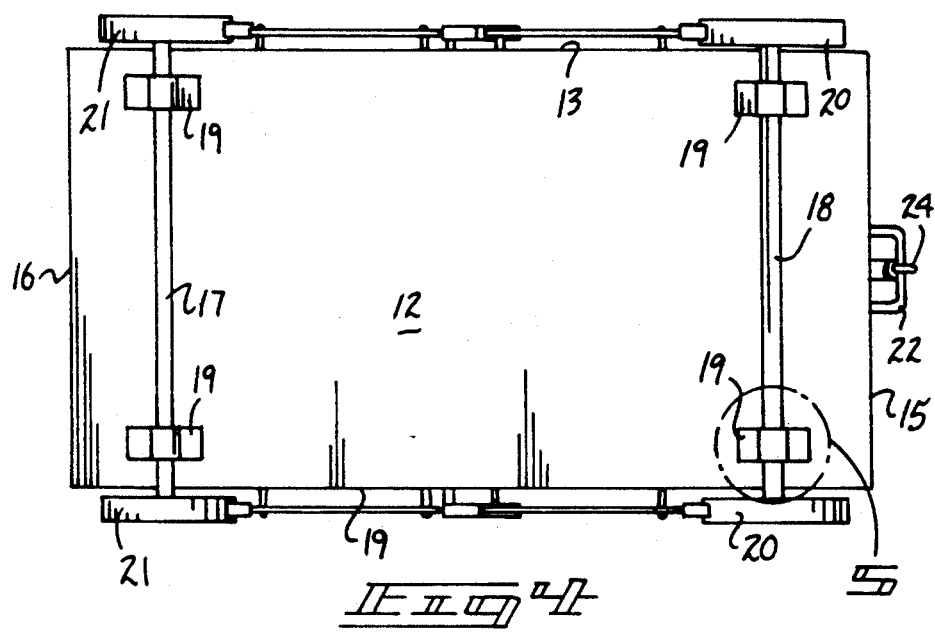
FIG. 4 is an orthographic bottom view of the instant invention.

With reference now to the drawings, and in particular to FIGS. 1 to 9 thereof, a new and improved recreation cart apparatus embodying the principles and concepts of the present invention and generally designated by the reference numeral 10 will be described.

Figure 5:
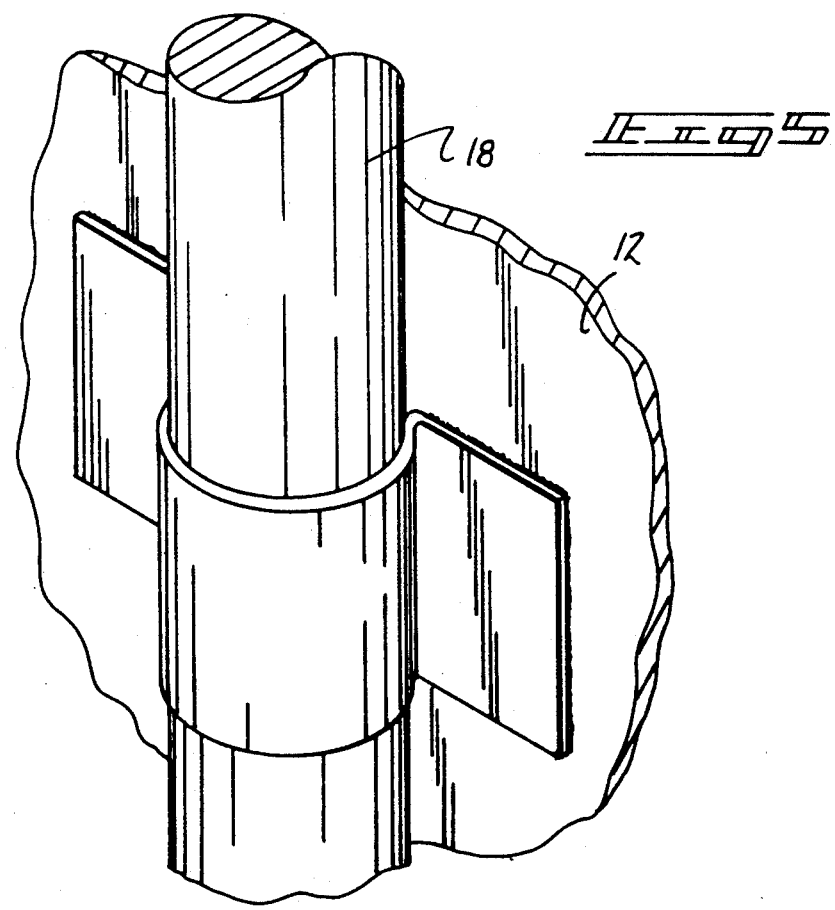
FIG. 5 is an isometric illustration, somewhat enlarged, of section 5 as set forth in FIG. 4.
Figure 6:
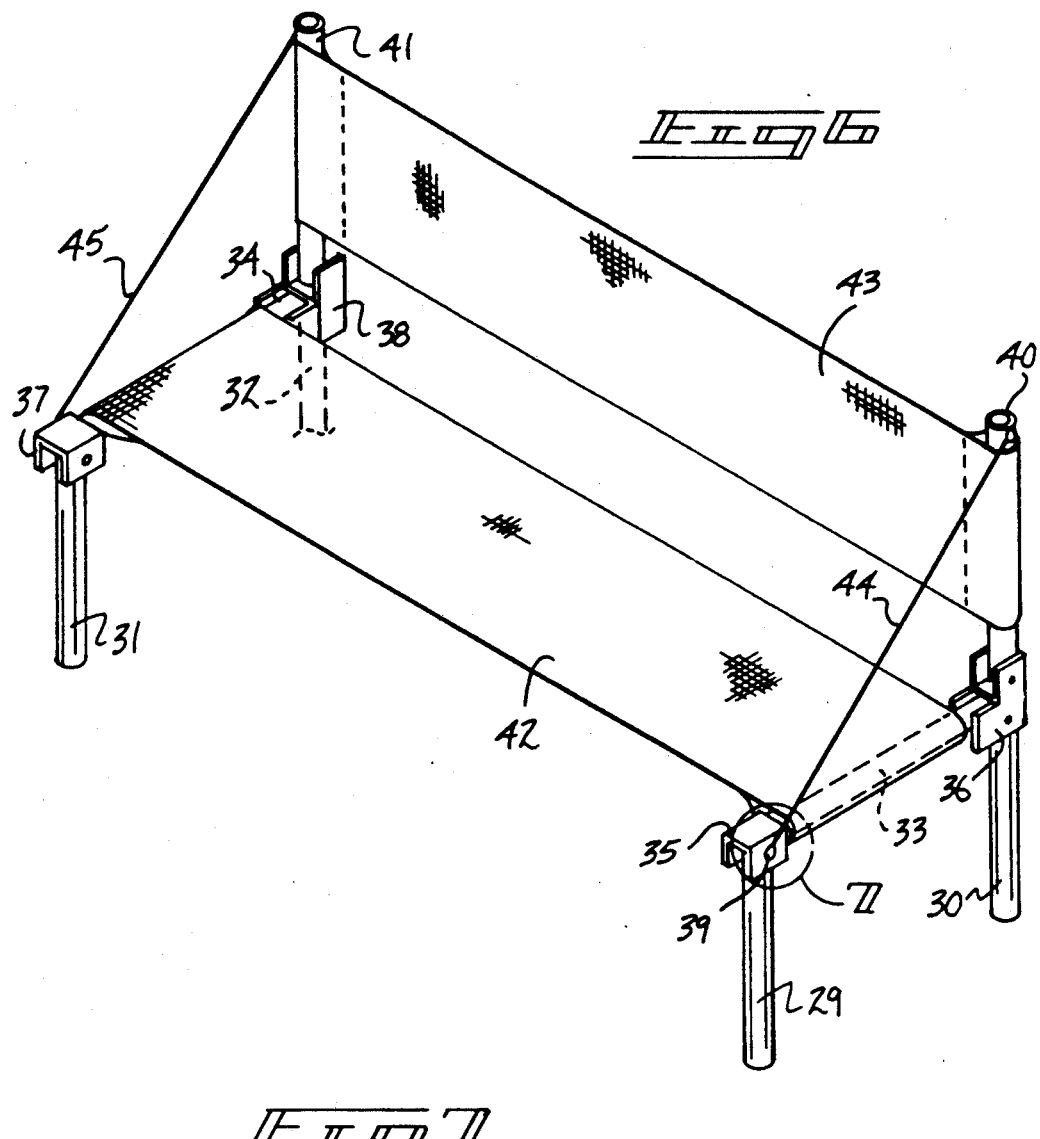
FIG. 6 is an isometric illustration of the seat structure in an erected configuration.

More specifically, the recreation cart apparatus 10 of the instant invention essentially comprises a cart structure including a support bed 11 formed with a floor 12, with the floor 12 including a first side wall 13 spaced from a second side wall 14, with a front end wall 15 spaced from a rear end wall 16. A rear axle 17 and a front axle 18 are arranged parallel relative to one another and positioned in a parallel relationship relative to an adjacent respective rear and front walls 16 and 15 respectively. The axles 17 and 18 are mounted to the bottom surface of the floor 12 by respective support straps 19, in a manner as illustrated in FIG. 5 for example. The straps each include a concave central portion to receive a respective axle in a fixed relationship. Respective forward and rear wheels 20 and 21 are mounted to outer distal ends of the respective front and rear axles 18 and 17 in rotative relationship. A front handle loop 22 is mounted medially to an exterior surface of the front end wall 15 releasably receiving a lower distal end of a rigid "T" shaped handle 23 that includes a locking clasp 24 mounted to its lower distal end for selective securement of the lower distal end of the "T" shaped handle 23 to the forward handle loop 22 permitting use of the handle 23 or the loop 22 in permitting transport or pulling of the cart structure.

Figure 7:
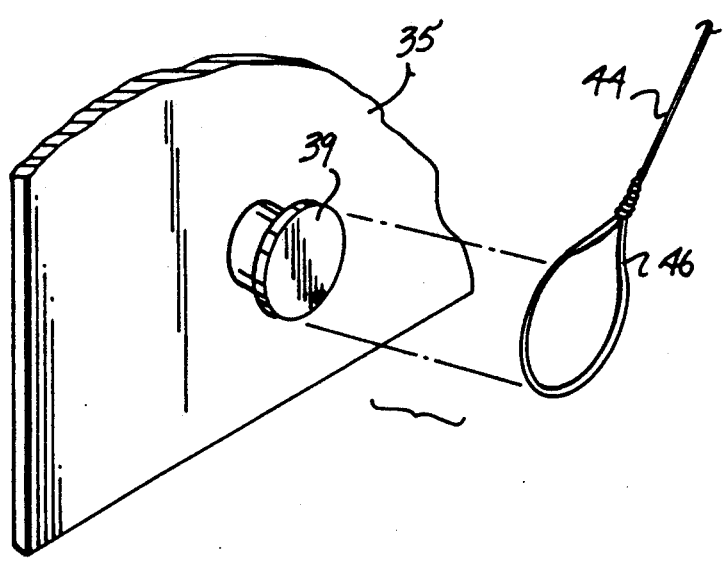
FIG. 7 is an isometric enlarged configuration of section 7 as set forth in FIG. 6.

Each intersection of the first and second side walls 13 and 14 with the front end wall 15 includes a respective first and second socket 25 and 26 mounted in a fixed orthogonal orientation relative to the top surface of the floor 12. Similarly, intersection of the rear end wall 16 with the respective first and second side walls 13 and 14 illustrates the use of the respective second and third sockets 26 and 27 oriented parallel to the first and second sockets, also orthogonally mounted fixedly to the floor 12. The sockets 25-28 each receive a respective support leg defined by a respective first, second, third, and fourth cylindrical support leg 29, 30, 31, and 32 respectively complementarily received within a respective first through fourth socket 25-28. The support legs forming part of the seat structure are provided to include a front cross tube 33 mounted to a respective first and second support bracket 35 and 36, with the first and second legs 29 and 30 pivotally mounted and received within the respective first and second support brackets 35 and 36, with a rear cross tube 34 mounted to the third and fourth support brackets 37 and 38, each including the respective third and fourth support legs 31 and 32 pivotally mounted to the third and fourth support brackets 37 and 38 to permit interfolding of the support legs relative to the support brackets, in a manner as illustrated in the FIG. 8 for example. Mounting boss 39 mounted to the respective first and third support brackets 35 and 37 project exteriorly of each support bracket and are oriented orthogonally relative to the respective front and rear cross tubes 33 and 34. A forward and rear seat tube 40 and 41 respectively pivotally mounted to the respective second and third support brackets 36 and 38 above the second and fourth support legs 30 and 32 include a flexible back web 43 extending coextensively between the forward and rear seat tubes 40 and 41. A flexible seat web 42 in a like manner is mounted coextensively between the front and rear cross tubes 33 and 34. A respective forward and rear tether line 44 and 45 mounted adjacent an upper distal end of the forward and rear seat tubes 40 and 41 are secured to the respective mounting bosses 39 of the respective first and third support brackets 35 and 37 permitting tensioning of the tether lines in securing an individual in a seated manner on the seat and back web structure. To this end, each tether line includes a tether line loop 46 of a type as illustrated in FIG. 7 to be received about the associated boss 39.

Braking structure associated with the instant invention includes a forward brake plate 47 and a rear brake plate 48 that are longitudinally aligned with a forward and rear brake plate 47 and 48 mounted to each side wall, in a manner as illustrated in FIG. 4. The forward and rear brake plates 47 and 48 includes respective forward and rear plate slots 51 and 52 that are longitudinally aligned and are spaced apart a predetermined spacing, with the forward slots directed through the forward brake plate and the rear slots directed through the rear brake plate. A forward boss member is directed through each forward slot, and a rear boss member is directed through each rear slot, with the boss members spaced apart a predetermined spacing equal to the predetermined spacing of the respective forward and rear plate slots of each respective brake plate. A brake lever 53 pivotally mounted about a pivot axle 54 is positioned between the forward and rear brake plates, with the pivot axle 54 positioned between the forward and rear brake plates and the brake lever 53 including a respective forward and rear cam surface 57 and 58 cooperative with the respective forward and rear brake plates to effect separation of the brake plates relative to one another to direct a respective forward and rear brake head 55 to 56 to a respective forward and rear wheel 20 and 21. The use of single brake lever permits turning of the cart, whereas application of both brake levers of each side wall provides for an efficient stopping of the organization in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A support bed, the support bed including a floor, with the floor including a first side wall spaced from a second side wall, and a front wall spaced from a rear wall, and the floor including a top surface and a bottom surface, with the bottom surface including a respective rear and front axle positioned parallel to and adjacent the respective rear and front end walls, and the front axle including a first and second front wheel positioned adjacent a first and second distal end of the front axle parallel to and adjacent the respective first and second side wall, with the rear axle including a respective first and second rear wheel positioned adjacent a respective rear axle first and second distal end, with the first and second rear wheels arranged parallel to and adjacent the respective first and second side walls, and the first side wall including a handle loop fixedly and medially mounted to a forward side wall front surface, with the front handle loop including a rigid "T" shaped handle pivotally mounted to the front handle loop, the rigid "T" shaped handle including a locking clasp mounted to a lower distal end of the rigid "T" shaped handle to permit selective securement of the "T" shaped handle to the front loop, and the floor top surface includes a respective first and second socket mounted contiguously with a first and second intersection of the respective first and second side wall with the front end wall, and a respective third and fourth socket positioned contiguously with an intersection of the first and second side wall with the rear end wall, and each of the first, second, third, and fourth sockets arranged parallel relative to one another and orthogonally mounted to the floor, and a seat member, the seat member including a first leg complementarily received within the first socket, a second leg complementarily received within the second socket, a third leg complementarily received within the third socket, and a fourth leg complementarily received within the fourth socket, and the seat member includes a front cross tube, the front cross tube including a first support bracket mounted at a forward end of the front cross tube, and a second support bracket mounted at a rear end of the front cross tube, wherein the first bracket pivotally mounts the first leg, and the second bracket pivotally mounts the second leg, and a rear cross tube including a third support bracket mounted to a forward end of the rear cross tube, and a fourth bracket mounted to a rear end of the rear cross tube, and the third support leg pivotally mounted to the third bracket, and a fourth leg pivotally mounted to the fourth bracket, and a flexible seat web mounted coextensively between the front cross tube and the rear cross tube, and a forward seat tube pivotally mounted to the second support bracket, and a rear seat tube pivotally mounted to the fourth support bracket, and a flexible back web mounted coextensively between the forward seat tube and the rear seat tube, and the first support bracket including a first mounting boss mounted fixedly and exteriorly of the first support bracket, and a second mounting boss mounted fixedly and exteriorly to the third support bracket, and the forward seat tube including a forward tether line mounted to an upper distal end of the forward seat tube, and a rear tether line mounted to an upper distal end of the rear seat tube, and the forward tether line selectively securable about the mounting boss, and the rear tether line selectively securable about the further mounting boss, with each tether line including a tether line loop for selective reception of a respective mounting boss therethrough, and the first side wall and second side wall include a respective first brake means a second brake means mounted to the respective first side wall and second side wall for selective turning and braking of the support bed, and each brake means includes a forward brake plate and a rear brake plate, wherein the forward brake plate and rear brake plate are longitudinally aligned relative to one another, and the forward brake plate includes a plurality of forward plate slots, and the rear brake plate includes a plurality of rear plate slots, wherein the forward plate slots are spaced apart a predetermined spacing and the rear plate slots are spaced apart the predetermined spacing, and each of the forward plate slots includes a forward boss member directed therethrough, wherein the forward boss members are spaced apart the predetermined spacing, and the rear plate slots each receive a respective rear boss member, wherein the rear boss members are spaced apart the predetermined spacing, and a brake lever pivotally mounted between the forward brake plate and the rear brake plate, and the brake lever including a pivot axle positioned between the forward brake plate and the rear brake plate.

2. An apparatus as set forth in claim 1 wherein a lower distal end of the brake lever includes a forward cam surface contiguously cooperative with a rear distal end of the forward brake plate, and a rear cam surface positioned adjacent the forward cam surface at the lower distal end of the brake lever cooperative with and in contiguous communication with a rear distal end of the rear brake plate, and the forward brake plate includes a forward brake head mounted fixedly to a forward terminal end of the forward brake plate, and a rear brake head mounted to a forward distal end of the rear brake plate.

* * * * *